(12) United States Patent
Sun et al.

(10) Patent No.: US 9,253,445 B2
(45) Date of Patent: Feb. 2, 2016

(54) TERMINAL MULTIPOINT CONTROL UNIT, SYSTEM AND METHOD FOR IMPLEMENTING HIGH DEFINITION MULTIPLE PICTURES

(75) Inventors: Bo Sun, Shenzhen (CN); Jun Meng, Shenzhen (CN); Peng Ding, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1070 days.

(21) Appl. No.: 13/381,754

(22) PCT Filed: May 19, 2010

(86) PCT No.: PCT/CN2010/072954
§ 371 (c)(1),
(2), (4) Date: Dec. 30, 2011

(87) PCT Pub. No.: WO2010/145391
PCT Pub. Date: Dec. 23, 2010

(65) Prior Publication Data
US 2012/0113212 A1    May 10, 2012

(30) Foreign Application Priority Data
Jun. 30, 2009   (CN) .......................... 2009 1 0108409

(51) Int. Cl.
*H04N 7/14* (2006.01)
*H04N 7/15* (2006.01)

(52) U.S. Cl.
CPC .............. *H04N 7/152* (2013.01); *H04N 7/148* (2013.01)

(58) Field of Classification Search
CPC ...................................... H04N 7/14
USPC ........... 348/14.01, 14.07, 14.12, 14.08, 14.09
See application file for complete search history.

(56) References Cited

U.S. PATENT DOCUMENTS

| | | | |
|---|---|---|---|
| 2006/0087553 A1 | 4/2006 | Kenoyer et al. | |
| 2006/0209206 A1* | 9/2006 | Wang | H04N 7/152 348/385.1 |
| 2009/0015661 A1* | 1/2009 | King et al. | 348/14.09 |

FOREIGN PATENT DOCUMENTS

| | | |
|---|---|---|
| CN | 1571508 A | 1/2005 |
| CN | 101262587 A | 9/2008 |

(Continued)

OTHER PUBLICATIONS

IETF MEGACO; "IP telephony", 2001; see pp. 13-27.

(Continued)

*Primary Examiner* — Olisa Anwah
(74) *Attorney, Agent, or Firm* — Ling Wu; Stephen Yang; Ling and Yang Intellectual Property

(57) ABSTRACT

A terminal, multipoint control unit, system and method for implementing high definition multiple pictures are provided by the present invention. The method comprises the following steps of: a Multipoint Control Unit (MCU) calculating a high definition video code stream format according to video conference control information, and sending a capability set containing the high definition video code stream format to a selected terminal; based on the high definition video code stream format in the capability set, the selected terminal encoding a high definition video image and sending the encoded high definition video code stream to the MCU; according to the video conference control information, the MCU synthesizing the received high definition video code stream image into multiple pictures, and obtaining the high definition multi-picture video code stream image and sending it to the terminals attending the conference.

14 Claims, 3 Drawing Sheets

(56) References Cited

FOREIGN PATENT DOCUMENTS

| CN | 101404748 A | 4/2009 |
| CN | 101594512 A | 12/2009 |

OTHER PUBLICATIONS

International Search Report for PCT/CN2010/072954 dated Aug. 1, 2010.

* cited by examiner

TERMINAL MULTIPOINT CONTROL UNIT, SYSTEM AND METHOD FOR IMPLEMENTING HIGH DEFINITION MULTIPLE PICTURES

TECHNICAL FIELD

The present invention relates to the field of video conference, and in particular, to a terminal, multipoint control unit, system and method for implementing high definition multiple pictures.

BACKGROUND ART

Multipicture application has the advantage of large amount of information, and is a very common application in a video conference system. Currently, the video format adopted in multiple pictures is generally 263 series and 264_CIF, 264_4CIF in 264 series, and the multipicture technologies adopting these video capabilities are already quite mature.

With the continuous increase of the user's requirements on image quality, many video conference factories releases high definition video systems of 720P, 1080I, 1080P in 264 series, and use of these high definition video formats in the multipicture application is the target pursued by each factory. However, the encoding and decoding ability of the video processing plate in the MCU (Multipoint Control Unit) device has to be greatly improved if a universal method for implementing multiple pictures is used such that the requirements on encoding and decoding of the high definition multi-picture video can be met. In order to improve the capability of the video codec, the MCU device producers have to invest much time and many funds, which, however, is not allowable in the current intense market competition.

SUMMARY OF THE INVENTION

The technical problem to be solved in the present invention is to provide a terminal, MCU, system and method for implementing high definition multiple pictures in a multipoint conference without the need of greatly improving the capability of the video codec in a MCU device.

In order to achieve the above purpose, the technical scheme of the present invention is implemented as follows:

a method for implementing high definition multiple pictures, comprising the following steps of:

a terminal receiving a capability set sent by a Multipoint Control Unit (MCU), the capability set including a high definition video code stream format calculated by the MCU according to video conference control information;

the terminal encoding a high definition video image according to the video code stream format and sending an encoded high definition video code stream to the MCU;

the terminal receiving a high definition multipicture video code stream image obtained after the MCU synthesizes the high definition video code stream image into multiple pictures and displaying the high definition multipicture video code stream image.

Wherein, the video conference control information comprises a number of pictures of a conference, a picture number of the terminal, and whether the terminal is viewed by other terminals.

A terminal for implementing high definition multiple pictures, comprising: a receiving module, an encoding module, a sending module and a displaying module, wherein:

the receiving module is used to receive a capability set sent by a Multipoint Control Unit (MCU), the capability set including a high definition video code stream format calculated according to video conference control information;

the encoding module is used to encode a high definition video image according to the high definition video code stream format in the capability set received by the receiving module;

the sending module is used to send the high definition video code stream encoded by the encoding module to the MCU;

the displaying module is used to receive a high definition multipicture video code stream image obtained after the MCU synthesizes the high definition video code stream image into multiple pictures and displaying the high definition multipicture video code stream image.

Wherein, the video conference control information comprises a number of pictures of a conference, a picture number of the terminal, and whether the terminal is viewed by other terminals.

A method for implementing high definition multiple pictures, comprising the following steps of:

a MCU calculating a high definition video code stream format according to video conference control information, and sending a capability set containing the high definition video code stream format to a selected terminal;

the MCU receiving a high definition video code stream encoded according to the high definition video code stream format and returned by the selected terminal;

the MCU synthesizing a received high definition video code stream image into multiple pictures according to the video conference control information to obtain a high definition multipicture video code stream image and send to terminals attending a conference.

Furthermore, the video conference control information comprises a number of pictures of the conference, a picture number of the selected terminal, and whether the selected terminal is viewed by other terminals.

Furthermore, when the selected terminal is not viewed by other terminals in the video conference control information, the step of the MCU calculating the high definition video code stream format is specifically: the MCU calculating a video size as the high definition video code stream format according to the number of pictures in the conference and the picture number of the selected terminal;

the step of the MCU synthesizing the received high definition video code stream image into multiple pictures is specifically: the MCU directly synthesizing the received high definition video code stream image into the multiple pictures.

Furthermore, when the selected terminal is viewed by other terminals in the video conference control information, the step of the MCU calculating the high definition video code stream format is specifically: the MCU selecting an original video size of the current terminal as the high definition video code stream format;

said step of the MCU synthesizing the received high definition video code stream image into multiple pictures is specifically: the MCU zooming the received high definition video code stream image according to the number of pictures in the conference and the picture number of the selected terminal, and then synthesizing the zoomed image into the multiple pictures.

Furthermore, when the MCU comprises a primary MCU and a secondary MCU, the method further comprises:

the primary MCU calculating the high definition video code stream format according to video conference control information, and sending the capability set containing the high definition video code stream format to the secondary MCU; the secondary MCU sending the capability set containing the high definition video code stream format to the selected terminal;

the secondary MCU receiving the high definition video code stream encoded according to the high definition video code stream format and returned by the selected terminal and forwarding to the primary MCU;

the primary MCU synthesizing the received high definition video code stream image into multiple pictures according to the video conference control information to obtain a high definition multipicture video code stream image and sending to terminals attending the conference through the secondary MCU.

A multipoint control unit for implementing high definition multiple pictures, comprising a primary MCU, which comprises a calculating module, a sending module, a receiving module and a synthesizing module, wherein:

the calculating module is used to calculate a high definition video code stream format according to video conference control information;

the sending module is used to send a capability set containing the high definition video code stream format to a selected terminal; and the sending module is also used to send a high definition multipicture video code stream image synthesized by the synthesizing module to terminals attending a conference;

the receiving module is used to receive a high definition video code stream encoded according to the high definition video code stream format and returned by the selected terminal;

the synthesizing module is used to synthesize a high definition video code stream image received by the receiving module into multiple pictures according to the video conference control information to obtain the high definition multi-picture video code stream image.

Wherein, the video conference control information comprises a number of pictures of the conference, a picture number of the selected terminal, and whether the selected terminal is viewed by other terminals.

The calculating module is further used to, when the selected terminal is not viewed by other terminals in the video conference control information, calculate a video size as the high definition video code stream format according to the number of pictures in the conference and the picture number of the selected terminal;

correspondingly, the synthesizing module is further used to directly synthesize the received high definition video code stream image into the multiple pictures.

The calculating module is further used to, when the selected terminal is viewed by other terminals in the video conference control information, select an original video size of the selected terminal as the high definition video code stream format;

correspondingly, the synthesizing module is further used to zoom the received high definition video code stream image according to the number of pictures in the conference and the picture number of the selected terminal, and then synthesize the zoomed high definition video code stream image into the multiple pictures.

The MCU further comprises a secondary MCU, correspondingly, the primary MCU is used to calculate the high definition video code stream format according to video conference control information, and send the capability set containing the high definition video code stream format to the secondary MCU; the primary MCU is also used to receive a high definition video code stream returned from the primary MCU, synthesize the received high definition video code stream image into multiple pictures according to the video conference control information to obtain a high definition multipicture video code stream image;

the secondary MCU is used to send the capability set containing the high definition video code stream format to the selected terminal, receive the high definition video code stream encoded according to the high definition video code stream format and returned by the selected terminal and forward to the primary MCU; the secondary MCU is also used to receive the high definition multipicture video code stream image synthesized by the primary MCU and send to terminals attending the conference.

A method for implementing high definition multiple pictures, comprising the following steps of:

a MCU calculating a high definition video code stream format according to video conference control information, and sending a capability set containing the high definition video code stream format to a selected terminal;

based on the high definition video code stream format in the capability set, the selected terminal encoding a high definition video image and sending an encoded high definition video code stream to the MCU;

according to the video conference control information, the MCU synthesizing the received high definition video code stream image into multiple pictures to obtain a high definition multi-picture video code stream image and sending to terminals attending a conference.

Wherein, the video conference control information comprises a number of pictures of the conference, a picture number of the selected terminal, and whether the selected terminal is viewed by other terminals.

Furthermore, when the selected terminal is not viewed by other terminals in the video conference control information, the step of the MCU calculating the high definition video code stream format is specifically: the MCU calculating a video size as the high definition video code stream format according to the number of pictures in the conference and the picture number of the selected terminal;

the step of the MCU synthesizing the received high definition video code stream image into multiple pictures is specifically: the MCU directly synthesizing the received high definition video code stream image into the multiple pictures.

Furthermore, when the selected terminal is viewed by other terminals in the video conference control information, the step of the MCU calculating the high definition video code stream format is specifically: the MCU selecting an original video size of the terminal as the high definition video code stream format;

said step of the MCU synthesizing the received high definition video code stream image into multiple pictures is specifically: the MCU zooming the received high definition video code stream image according to the number of pictures in the conference and the picture number of the selected terminal, and then synthesizing the zoomed high definition video code stream image into the multiple pictures.

Furthermore, when the MCU comprises a primary MC and a secondary MCH, the method further comprises:

the primary MCU calculating the high definition video code stream format according to video conference control information, and sending the capability set containing the high definition video code stream format to the secondary MCU; the secondary MCU sending the capability set containing the high definition video code stream format to the selected terminal;

the selected terminal receiving the capability set from the secondary MCU, and encoding the high definition video image based on the high definition video code stream format, and sending the encoded high definition video code stream to the secondary MCU;

the secondary MCU receiving the high definition video code stream encoded according to the high definition video code stream format and returned by the selected terminal and forwarding to the primary MCU;

the primary MCU synthesizing the received high definition video code stream image into multiple pictures according to the video conference control information to obtain the high definition multipicture video code stream image and sending to terminals attending a conference through the secondary MCU.

A system for implementing high definition multiple pictures, comprising a terminal and a MCU, the MCU is used to calculate a high definition video code stream format according to video conference control information, and send a capability set containing the high definition video code stream format to a selected terminal; the MCU is also used to receive a high definition video code stream encoded by the selected terminal, and synthesize a received high definition video code stream image into multiple pictures according to the video conference control information to obtain a high definition multipicture video code stream image and send to terminals attending a conference;

the terminal is used to receive the capability set sent by the MCU and encode a high definition video image based on the high definition video code stream format, and send the encoded high definition video code stream to the MCU; the terminal is also used to receive and display the high definition multipicture video code stream image synthesized by the MCU.

Wherein, the video conference control information comprises a number of pictures of the conference, a picture number of the selected terminal, and whether the selected terminal is viewed by other terminals.

The MCU is further used to, when the selected terminal is not viewed by other terminals in the video conference control information, calculate a video size as the high definition video code stream format according to the number of pictures in the conference and the picture number of the selected terminal; the MCU is also used to directly synthesize the received high definition video code stream image into the multiple pictures.

the MCU is further used to, when the selected terminal is viewed by other terminals in the video conference control information, select an original video size of the selected terminal as the high definition video code stream format; the MCU is also used to, zoom the received high definition video code stream image according to the number of pictures in the conference and the picture number of the selected terminal, and then synthesize the zoomed high definition video code stream image into the multiple pictures.

The MCU comprises a primary MCU and a secondary MCU, wherein:

the primary MCU is used to calculate the high definition video code stream format according to video conference control information, and send a capability set containing the high definition video code stream format to the secondary MCU; the primary MCU is also used to receive a high definition video code stream returned from the primary MCU, synthesize the received high definition video code stream image into multiple pictures according to the video conference control information to obtain the high definition multipicture video code stream image;

the secondary MCU is used to send the capability set containing the high definition video code stream format to a selected terminal; the secondary MCU is also used to receive the high definition video code stream encoded by the selected terminal and forward to the primary MCU; the secondary MCU is also used to receive the high definition multipicture video code stream image synthesized by the primary MCU and send to terminals attending the conference;

correspondingly, the terminal is also used to receive the capability set sent by the secondary MCU and encode the high definition video image based on the high definition video code stream format, and send the encoded high definition video code stream to the secondary MCU; the terminal is also used to receive and display the high definition multipicture video code stream image forwarded by the secondary MCU.

The present invention has the following beneficial effects over the prior art:

1. in the present invention, the MCU is used to send a capability set to a terminal, and the terminal encodes according to the high definition video format in the capability set, in which way the encoding and decoding capability of the terminal can be used fully, the spending on MCU encoding and decoding is reduced, and the problem that the existing method for implementing a high definition multipicture conference has too high requirements on the capability of the MCU image codec is resolved; meanwhile, the practice that terminal device adjusts the video transmission format according to a capability re-switching result during the conference conforms to the conference TV protocol standards, therefore, the MCU using the method of the present invention can coordinate with the terminal device of any factory in the industry to implement the high definition multipicture function, and thus has a high applicability.

2. when the terminal is not viewed by other terminals in the present invention, the MCU calculates the high definition video code stream format and sends it to the terminal, the terminal encodes according to the format and returns to the MCU, and then the MCU directly the high definition video image into the corresponding pictures without making any change to the format, thereby reducing the encoding and decoding burden of the MCU, achieving the effect of implementing a high definition multipicture conference with lower requirements on encoding and decoding capability, and saving the time and spending of the producers for improving the capability of the image codec;

3, when the terminal is viewed by other terminals in the present invention, code streams are transmitted between the MCU and the terminal using the original format, thereby meeting the requirement that other terminals can still view an image of complete capability even if the terminal does not increase high definition video encoding nodes;

4, the present invention also makes it possible to implement a high definition multipicture conference system with a lower encoding and decoding capability requirement even in a case of MCU cascading by forwarding a capability set and high definition video code stream between a primary MCU and a secondary MCU.

SPECIFIC EMBODIMENTS

The present invention will be further described in detail below with reference to the specific embodiments and the drawings.

For the video multipicture combination mode involved in the present invention, reference may be made to H.243 protocol "Procedures for establishing communication between three or more audiovisual terminals using digital channels up to 1920 kbit/s", and the conference TV system involved in the present invention comprises systems complying with ITU-T H.320, ITU-T H323 and IETF SIP standards.

A specific embodiment of the system for implementing high definition multiple pictures in the present invention comprises a terminal and a MCU. The MCU is used to calculate a high definition video code stream format according to video conference control information, and send a capability set containing the high definition video code stream format to a selected terminal; the terminal is used to receive the capability set sent by the MCU and encode a high definition video image according to the high definition video code stream format and send an encoded high definition video code stream to the MCU; the MCU is also used to receive the encoded high definition video code stream, and synthesize the received high definition video code stream image into multiple pictures according to the video conference control information to obtain a high definition multipicture video code stream image and send to terminals attending a conference.

The video conference control information comprises a number of pictures of a conference, a picture number of the selected terminal, and whether the selected terminal is viewed by other terminals and so on.

When the selected terminal is not viewed by other terminals in the video conference control information, the MCU is further used to calculate a video size as the high definition video code stream format according to the number of pictures in the conference and the picture number of the selected terminal, wherein the video size may be indicated by the number of macro blocks; the MCU is also used to directly synthesize the received high definition video code stream image into the multiple pictures.

When the selected terminal is viewed by other terminals in the video conference control information, the MCU is further used to select an original video size of the selected terminal as the high definition video code stream format; zoom the received high definition video code stream image according to the number of pictures in the conference and the picture number of the selected terminal, and then synthesize the zoomed high definition video code stream image into the multiple pictures.

Figure 1:
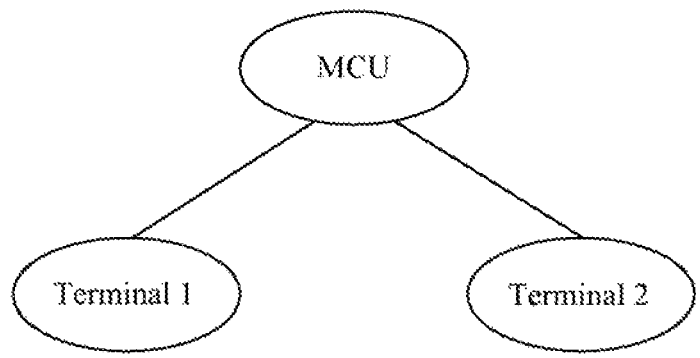
FIG. 1 illustrates the structure of a specific embodiment of the system according to the present invention.

There may be multiple terminals, and in this embodiment, there are two terminals, namely, terminal 1 and terminal 2 respectively, as shown in FIG. 1. The terminal can operate at asymmetrical video bit rate, frame rate and image resolution (if resolutions of multiple types of images are supported). For example, a terminal with a capability of 720P is allowed to send a ¹⁄₁₆ 720P image and receive a 720P image.

Figure 2:
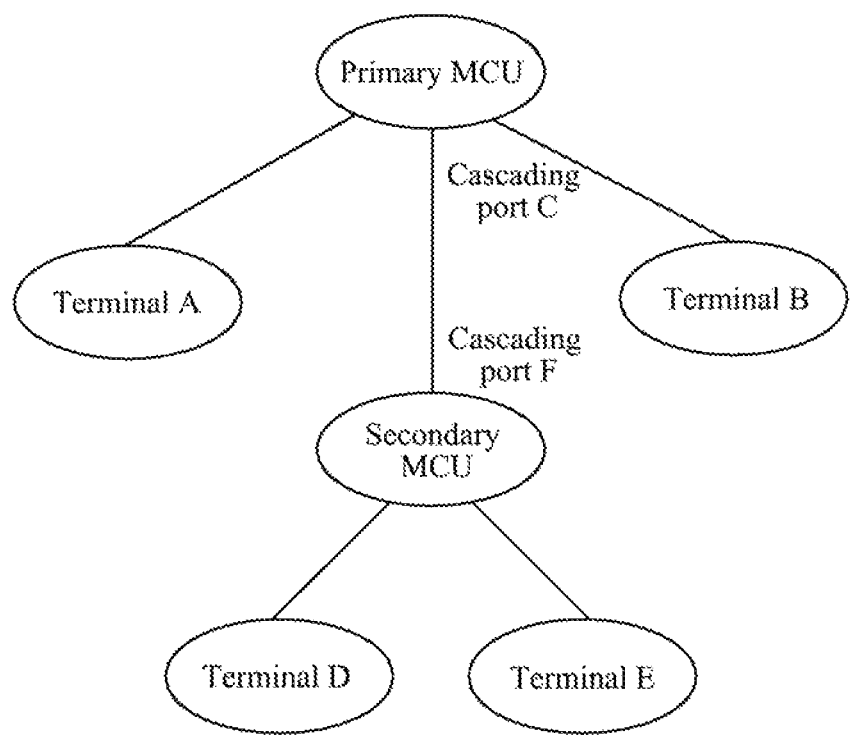
FIG. 2 illustrates the structure of another specific embodiment of the system according to the present invention.

In another embodiment of the system of the present invention, the MCU comprises a primary MCU and a secondary MCU. There may be multiple secondary MCUs, and in this embodiment, there is one primary MCU and one secondary MCU, as shown in FIG. 2. The primary MCU is connected with terminal A and terminal B, the secondary MCU is connected with terminal D and terminal E, and the primary MCU is connected to a cascading port F of the secondary MCU via a cascading port C.

The primary MCU is used to calculate a high definition video code stream format according to video conference control information, and send a capability set containing the high definition video code stream format to the secondary MCU; the secondary MCU is used to send the capability set containing the high definition video code stream format to a selected terminal, and receive a high definition video code stream encoded according to the high definition video code stream format and returned by the selected terminal and forward to the primary MCU; the primary MCU is also used to receive the high definition video code stream forwarded from the secondary MCU, synthesize the received high definition video code stream image into multiple pictures according to the video conference control information to obtain a high definition multipicture video code stream image and send to terminals attending a conference through the secondary MCU.

A specific embodiment of the method for implementing high definition multiple pictures in the present invention comprises a process of a MCU controlling a terminal to send a high definition video code stream and synthesizing the high definition video code stream image into multiple pictures, and this process comprises the following steps:

step A3. the MCU calculating a high definition video code stream format according to video conference control information, step B3. the MCU sending a capability set containing the high definition video code stream format to a selected terminal;

step C3. the terminal receiving the capability set sent by the MCU, and encoding the high definition video image based on the high definition video code stream format, and sending the encoded high definition video code stream to the MCU;

step D3. the MCU receiving the high definition video code stream;

step E3. the MCU synthesizing the received high definition video code stream image into multiple pictures according to the video conference control information to obtain a high definition multipicture video code stream image and sending to terminals attending a conference for displaying.

In this embodiment, the video conference control information comprises information such as the number of pictures of the conference, the picture number of the selected terminal, and whether the selected terminal is viewed by other terminals and so on.

When the selected terminal is not viewed by other terminals, the following operation is specifically executed in step A3: the MCU calculating a video size, for example, the number of macro blocks, according to the number of pictures in the conference and the picture number of the selected terminal; the following operation is specifically executed in step E3: the MCU directly synthesizing the received high definition video code stream image into a picture corresponding to the multiple pictures.

When the selected terminal is viewed by other terminals, the following operation is specifically executed in step A3: the MCU selecting an original video size of the selected terminal as the high definition video code stream format; the following operation is specifically executed in step E3: the MCU zooming the received high definition video code stream image according to the number of pictures in the conference and the picture number of the selected terminal, and then synthesizing the zoomed high definition video code stream image into the multiple pictures.

In another embodiment of the method of the present invention, the MCU comprises a primary MCU and a secondary MCU, the step A3 is specifically implemented through the primary MCU calculating a high definition video code stream format according to video conference control information and sending a capability set containing the high definition video code stream format to the secondary MCU;

the step B3 is specifically implemented through the secondary MCU sending the capability set containing the high definition video code stream format to a selected terminal;

the step C3 is specifically implemented through the terminal receiving the capability set sent from the secondary MCU, encoding the high definition video image based on the high definition video code stream format, and sending the encoded high definition video code stream to the secondary MCU;

the step D3 is specifically implemented through the secondary MCU receiving a high definition video code stream encoded according to the high definition video code stream format and returned by the selected terminal and forwarding to the primary MCU;

the step E3 is specifically implemented through the primary MCU synthesizing the received high definition video code stream image into multiple pictures according to the video conference control information.

The terminal for implementing high definition multiple pictures in the present invention comprises: a receiving module, an encoding module, a sending module and a displaying module, wherein: the receiving module is used to receive a capability set sent by a MCU, the capability set including a high definition video code stream format calculated according to video conference control information; the encoding module is used to encode a high definition video image according to the high definition video code stream format in the capability set received by the receiving module; the sending module is used to send the high definition video code stream encoded by the encoding module to the MCU; the displaying module is used to receive a high definition multipicture video code stream image obtained after the MCU synthesizes the high definition video code stream image into multiple pictures and displaying the high definition multipicture video code stream image.

The MCU for implementing high definition multiple pictures in the present invention comprises a primary MCU. The primary MCU comprises: a calculating module, a sending module, a receiving module and a synthesizing module, wherein: the calculating module is used to calculate a high definition video code stream format according to video conference control information; the sending module is used to send a capability set containing the high definition video code stream format to a selected terminal; and the sending module is also used to send a high definition multipicture video code stream image synthesized by the synthesizing module to terminals attending the conference; the receiving module is used to receive a high definition video code stream encoded according to the high definition video code stream format and returned by the selected terminal; the synthesizing module is used to synthesize the high definition video code stream image received by the receiving module into multiple pictures according to the video conference control information to obtain a high definition multipicture video code stream image.

Wherein, the calculating module is further used to, when the selected terminal is not viewed by other terminals in the video conference control information, calculate a video size as the high definition video code stream format according to the number of pictures in the conference and the picture number of the selected terminal; correspondingly, the synthesizing module is further used to directly synthesize the received high definition video code stream image into the multiple pictures.

In addition, the calculating module is further used to, when the selected terminal is viewed by other terminals in the video conference control information, select an original video size of the selected terminal as the high definition video code stream format; correspondingly, the synthesizing module is further used to zoom the received high definition video code stream image according to the number of pictures in the conference and the picture number of the selected terminal, and then synthesize the zoomed high definition video code stream image into the multiple pictures.

The MCU of the present invention further comprises a secondary MCU, correspondingly, the primary MCU is used to calculate a high definition video code stream format according to video conference control information, and send a capability set containing the high definition video code stream format to the secondary MCU; the primary MCU is also to receive a high definition video code stream returned from the primary MCU, synthesize the received high definition video code stream image into multiple pictures according to the video conference control information to obtain a high definition multipicture video code stream image;

the secondary MCU is used to send the capability set containing the high definition video code stream format to a selected terminal, receive the high definition video code stream encoded according to the high definition video code stream format and returned by the selected terminal and forward to the primary MCU; the secondary MCU is also used to receive the high definition multipicture video code stream image synthesized by the primary MCU and send to terminals attending the conference.

EXAMPLE ONE

Figure 3:
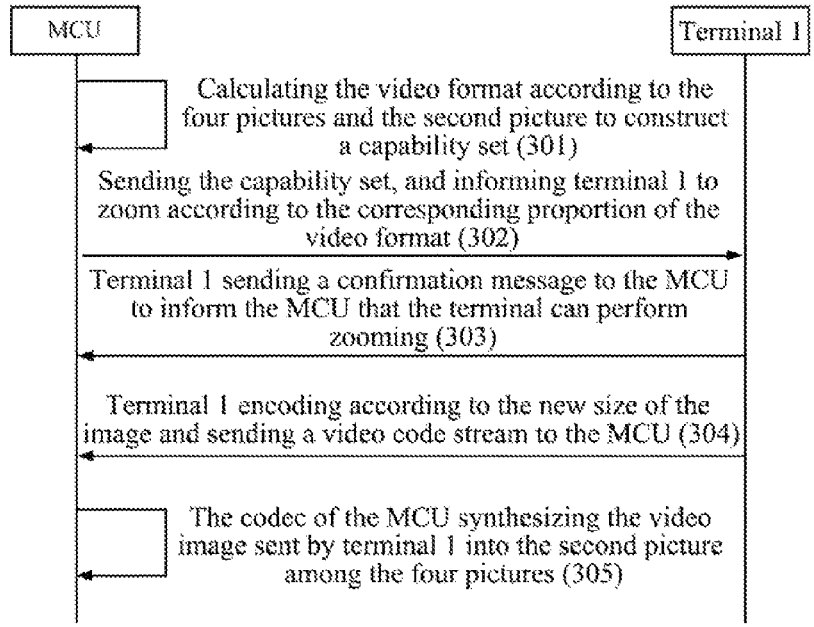
FIG. 3 is a flowchart of signaling in Method example one according to the present invention.

This example is to implement a 720P conference of four pictures using the method of the present invention based on the system described in FIG. 1. This example is a H.323 system, both terminal 1 and terminal 2 support asymmetrical encoding and decoding of images, terminal 1 is designated as the second picture among the four pictures and is not viewed by any terminal in the multipoint conference. Its flow, as shown in FIG. 3, comprises the following steps:

step 301, a MCU providing according to the H.243 protocol that the second picture among the four pictures occupies ¼ of the whole image, and the number of macro blocks is (1280×720)/(16×16)=3600, ¼ of the macro blocks is 900, the capability set constructed by the MCU according to the obtained new number of macro blocks is as follows:

```
Item 0: Profile
Item
    parameterIdentifier: standard (0)
        standard: 41 - Profile
    parameterValue: booleanArray (1)
        booleanArray: 64
        Profile: 0x40, Baseline Profile
            .1.. .... = Baseline Profile: True
            ..0. .... = Main Profile: False
            ...0 .... = Extended Profile.: False
            .... 0... = High Profile: False
            .... .0.. = High 10 Profile: False
            .... ..0. = High 4:2:2 Profile: False
            .... ...0 = High 4:4:4 Profile: False
Item 1: Level
```

-continued

```
Item
    parameterIdentifier: standard (0)
        standard: 42 - Level
    parameterValue: unsignedMin (2)
        unsignedMin: 50 - Level 2.1
Item 2: CustomMaxMBPS
Item
    parameterIdentifier: standard (0)
        standard: 3 - CustomMaxMBPS
    parameterValue: unsignedMin (2)
        unsignedMin: 54
Item 3: CustomMaxFS
Item
    parameterIdentifier: standard (0)
        standard: 4 - CustomMaxFS
        parameterValue: unsignedMin (2)
            unsignedMin: 4
``` step 302, the MCU sending the capability set to terminal 1, and informing terminal 1 to zoom according to the video format in the capability set;

step 303, after receiving the capability set, terminal 1 keeping the format of 16:4 since it does not rejoin the conference. According to the capability, the size is judged to be 1024 macro blocks, and a confirmation message indicating that zooming can be performed is sent to the MCU;

step 304, terminal 1 selecting a most approximate (downward) format ¼ 720p from the commonly used formats to zoom, and then reopens a logic channel, and sending a video code stream with a size of ¼ 720P to the MCU in the channel;

step 305, the image codec of the MCU directly synthesizing the image of this path into the second picture among the four pictures.

As can be seen, the capability consumed for the MCU image codec to zoom the 720P image is saved in step 305.

EXAMPLE TWO

Figure 4:
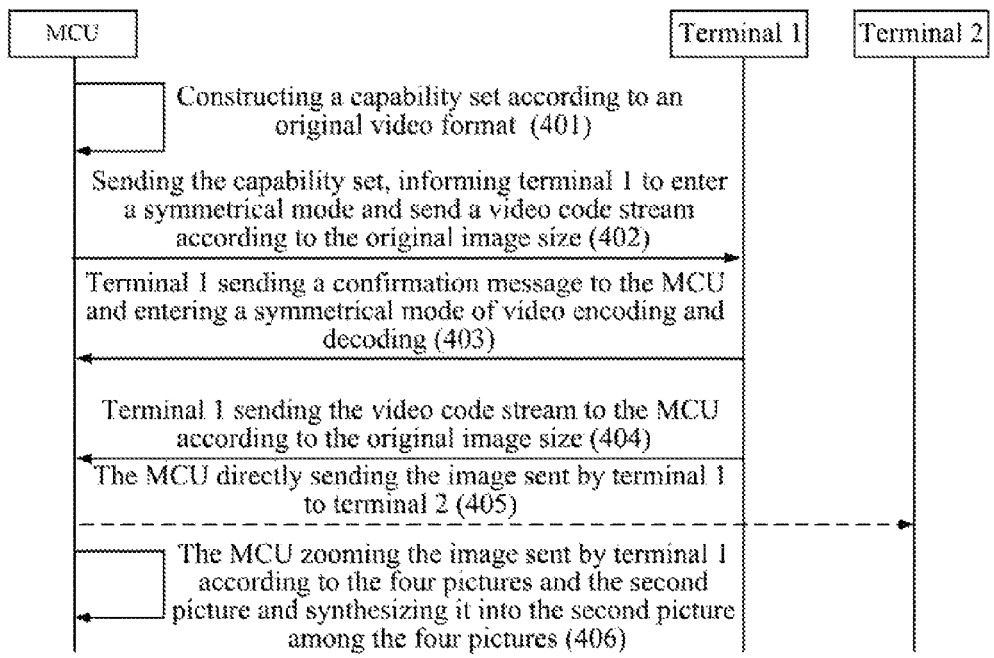
FIG. 4 is a flowchart of signaling in Method example two according to the present invention.

This example is an example of terminal 2 selecting to view a single picture of terminal 1 based on Example one, and its flow, as shown in FIG. 4, comprises the following steps:

step 401, the MCU constructing a capability set according to the original image size of 720P;

step 402, the MCU sending the capability set to terminal 1, i.e., having a capability interaction with terminal 1 according to the capability of 720P, and informing terminal 1 to send over a 720P image with a compete size;

step 403, terminal 1 sending a confirmation message, and entering a symmetrical mode of video encoding and decoding;

step 404, terminal 1 sending a video code stream of 720P to the MCU;

step 405, the MCU sending this code stream to terminal 2 to achieve the purpose that a complete 720P capability image can be viewed at the terminal 2;

step 406, the MCU also synthesizing the image of this path into the second picture among the four pictures after zooming it according to the second picture among the four pictures, and sending to other terminals in the multipoint conference, for example, terminal 1.

EXAMPLE THREE

This example is to implement MCU cascading multipicture conference using the method of the present invention based on the system described in FIG. 2. The devices in the multipoint conference in FIG. 2 have a primary MCU and a secondary MCU respectively, wherein, terminals A and B as well as a cascading port C are hung up under the primary MCU, and terminals D and E as well as a cascading port F are hung up under the secondary MCU.

Figure 5:
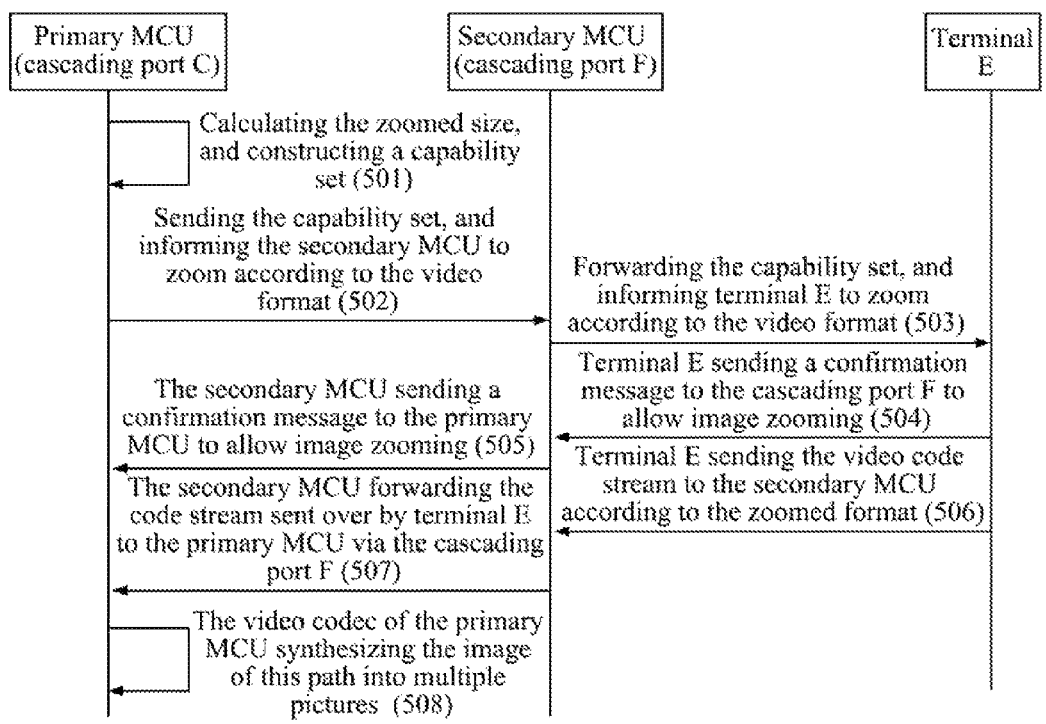
FIG. 5 is a flowchart of signaling in Method example three according to the present invention.

The primary conference in this example is a multipicture conference, and the cascading port C is designated as a certain picture among multiple pictures. Currently the video source for the secondary MCY is terminal E. The flow of the Example, as shown in FIG. 5, comprises the following steps:

step 501, after designating the cascading port C as the a certain picture among multiple pictures, the primary MCU calculating the size of the image after zooming according to the H.243 protocol, and constructing a capability set;

step 502, the capability set being sent to the cascading port F of the secondary MCU via the cascading port C, and the secondary MCU being notified by capability re-switching to zoom the image according to the format in the capability set;

step 503, after receiving the terminalCapbilitySet message from the cascading port F, the secondary MCU forwarding the message to terminal E of the secondary MCU;

step 504, terminal E sending a confirmation message to the cascading port F to allow image zooming;

step 505, the secondary MCU receiving the confirmation message sent from the cascading port F and forwarding it to the primary MCU;

step 506, terminal E keeping the format of 16:4 since it does not rejoin the conference, reopening the video logic channel between terminal E and the secondary MCU, and sending the zoomed video code stream to the secondary MCU;

step 507, the secondary MCU also reopening the video logic channel of the cascading port F between the secondary MCU and the primary MCU so that the zoomed image sent by terminal E is sent to the primary MCU via the cascading port F;

step 508, the video codec of the primary MCU synthesizing the image of this path into multiple pictures, thereby achieving the purpose of high definition cascading multipicture conference with a lower image encoding and decoding capability.

The above content is only further description made on the present invention with reference to specific preferred embodiments, and thus shall not be construed as a limitation to the specific embodiments of the present invention. For a person having ordinary skill in the art, several simple deductions or substitutions can be made without departing from the conception of the present invention, and these deductions or substitutions shall be regarded as within the protection scope of the present invention.

What is claimed is:

1. A method for implementing high definition multiple pictures, comprising following steps of:

a terminal receiving a capability set sent by a Multipoint Control Unit (MCU), the capability set including a high definition video code stream format calculated by the MCU according to video conference control information;

the terminal encoding a high definition video image according to the video code stream format and sending an encoded high definition video code stream to the MCU;

the terminal receiving a high definition multipicture video code stream image obtained after the MCU synthesizes the high definition video code stream image into multiple pictures and displaying the high definition multipicture video code stream image;

wherein, the video conference control information comprises a number of pictures of a conference, a picture number of the terminal, and whether the terminal is viewed by other terminals.

2. A terminal for implementing high definition multiple pictures, comprising: a receiving module, an encoding module, a sending module and a displaying module, wherein:
the receiving module is used to receive a capability set sent by a Multipoint Control Unit (MCU), the capability set including a high definition video code stream format calculated according to video conference control information;
the encoding module is used to encode a high definition video image according to the high definition video code stream format in the capability set received by the receiving module;
the sending module is used to send the high definition video code stream encoded by the encoding module to the MCU;
the displaying module is used to receive a high definition multipicture video code stream image obtained after the MCU synthesizes the high definition video code stream image into multiple pictures and displaying the high definition multipicture video code stream image;
wherein, the video conference control information comprises a number of pictures of a conference, a picture number of the terminal, and whether the terminal is viewed by other terminals.

3. A method for implementing high definition multiple pictures, comprising following steps of:
a MCU calculating a high definition video code stream format according to video conference control information, and sending a capability set containing the high definition video code stream format to a selected terminal;
the MCU receiving a high definition video code stream encoded according to the high definition video code stream format and returned by the selected terminal;
the MCU synthesizing a received high definition video code stream image into multiple pictures according to the video conference control information to obtain a high definition multipicture video code stream image and send to terminals attending a conference
wherein, the video conference control information comprises a number of pictures of the conference, a picture number of the selected terminal, and whether the selected terminal is viewed by other terminals.

4. The method according to claim 3, wherein, when the selected terminal is not viewed by other terminals in the video conference control information, the step of the MCU calculating the high definition video code stream format is specifically: the MCU calculating a video size as the high definition video code stream format according to the number of pictures in the conference and the picture number of the selected terminal;
the step of the MCU synthesizing the received high definition video code stream image into multiple pictures is specifically: the MCU directly synthesizing the received high definition video code stream image into the multiple pictures.

5. The method according to claim 3, wherein, when the selected terminal is viewed by other terminals in the video conference control information, the step of the MCU calculating the high definition video code stream format is specifically: the MCU selecting an original video size of the current terminal as the high definition video code stream format;
said step of the MCU synthesizing the received high definition video code stream image into multiple pictures is specifically: the MCU zooming the received high definition video code stream image according to the number of pictures in the conference and the picture number of the selected terminal, and then synthesizing the zoomed image into the multiple pictures.

6. The method according to claim 3, wherein, when the MCU comprises a primary MCU and a secondary MCU, the method further comprises:
the primary MCU calculating the high definition video code stream format according to video conference control information, and sending the capability set containing the high definition video code stream format to the secondary MCU; the secondary MCU sending the capability set containing the high definition video code stream format to the selected terminal;
the secondary MCU receiving the high definition video code stream encoded according to the high definition video code stream format and returned by the selected terminal and forwarding to the primary MCU;
the primary MCU synthesizing the received high definition video code stream image into multiple pictures according to the video conference control information to obtain a high definition multipicture video code stream image and sending to terminals attending the conference through the secondary MCU.

7. A multipoint control unit for implementing high definition multiple pictures, comprising a primary MCU, which comprises a calculating module, a sending module, a receiving module and a synthesizing module, wherein:
the calculating module is used to calculate a high definition video code stream format according to video conference control information;
the sending module is used to send a capability set containing the high definition video code stream format to a selected terminal; and the sending module is also used to send a high definition multipicture video code stream image synthesized by the synthesizing module to terminals attending a conference;
the receiving module is used to receive a high definition video code stream encoded according to the high definition video code stream format and returned by the selected terminal;
the synthesizing module is used to synthesize a high definition video code stream image received by the receiving module into multiple pictures according to the video conference control information to obtain the high definition multipicture video code stream image;
wherein, the video conference control information comprises a number of pictures of the conference, a picture number of the selected terminal, and whether the selected terminal is viewed by other terminals.

8. The multipoint control unit according to claim 7, wherein,
the calculating module is further used to, when the selected terminal is not viewed by other terminals in the video conference control information, calculate a video size as the high definition video code stream format according to the number of pictures in the conference and the picture number of the selected terminal;
correspondingly, the synthesizing module is further used to directly synthesize the received high definition video code stream image into the multiple pictures.

9. The multipoint control unit according to claim 7, wherein, the calculating module is further used to, when the selected terminal is viewed by other terminals in the video conference control information, select an original video size of the selected terminal as the high definition video code stream format;

correspondingly, the synthesizing module is further used to zoom the received high definition video code stream image according to the number of pictures in the conference and the picture number of the selected terminal, and then synthesize the zoomed high definition video code stream image into the multiple pictures.

10. The multipoint control unit according to claim 7, wherein, the MCU further comprises a secondary MCU, correspondingly, the primary MCU is used to calculate the high definition video code stream format according to video conference control information, and send the capability set containing the high definition video code stream format to the secondary MCU; the primary MCU is also used to receive a high definition video code stream returned from the primary MCU, synthesize the received high definition video code stream image into multiple pictures according to the video conference control information to obtain a high definition multipicture video code stream image;

the secondary MCU is used to send the capability set containing the high definition video code stream format to the selected terminal, receive the high definition video code stream encoded according to the high definition video code stream format and returned by the selected terminal and forward to the primary MCU; the secondary MCU is also used to receive the high definition multipicture video code stream image synthesized by the primary MCU and send to terminals attending the conference.

11. The method according to claim 4, wherein, when the MCU comprises a primary MCU and a secondary MCU, the method further comprises:

the primary MCU calculating the high definition video code stream format according to video conference control information, and sending the capability set containing the high definition video code stream format to the secondary MCU; the secondary MCU sending the capability set containing the high definition video code stream format to the selected terminal;

the secondary MCU receiving the high definition video code stream encoded according to the high definition video code stream format and returned by the selected terminal and forwarding to the primary MCU;

the primary MCU synthesizing the received high definition video code stream image into multiple pictures according to the video conference control information to obtain a high definition multipicture video code stream image and sending to terminals attending the conference through the secondary MCU.

12. The method according to claim 5, wherein, when the MCU comprises a primary MCU and a secondary MCU, the method further comprises:

the primary MCU calculating the high definition video code stream format according to video conference control information, and sending the capability set containing the high definition video code stream format to the secondary MCU; the secondary MCU sending the capability set containing the high definition video code stream format to the selected terminal;

the secondary MCU receiving the high definition video code stream encoded according to the high definition video code stream format and returned by the selected terminal and forwarding to the primary MCU;

the primary MCU synthesizing the received high definition video code stream image into multiple pictures according to the video conference control information to obtain a high definition multipicture video code stream image and sending to terminals attending the conference through the secondary MCU.

13. The multipoint control unit according to claim 8, wherein, the MCU further comprises a secondary MCU, correspondingly, the primary MCU is used to calculate the high definition video code stream format according to video conference control information, and send the capability set containing the high definition video code stream format to the secondary MCU; the primary MCU is also used to receive a high definition video code stream returned from the primary MCU, synthesize the received high definition video code stream image into multiple pictures according to the video conference control information to obtain a high definition multipicture video code stream image;

the secondary MCU is used to send the capability set containing the high definition video code stream format to the selected terminal, receive the high definition video code stream encoded according to the high definition video code stream format and returned by the selected terminal and forward to the primary MCU; the secondary MCU is also used to receive the high definition multipicture video code stream image synthesized by the primary MCU and send to terminals attending the conference.

14. The multipoint control unit according to claim 9, wherein, the MCU further comprises a secondary MCU, correspondingly, the primary MCU is used to calculate the high definition video code stream format according to video conference control information, and send the capability set containing the high definition video code stream format to the secondary MCU; the primary MCU is also used to receive a high definition video code stream returned from the primary MCU, synthesize the received high definition video code stream image into multiple pictures according to the video conference control information to obtain a high definition multipicture video code stream image;

the secondary MCU is used to send the capability set containing the high definition video code stream format to the selected terminal, receive the high definition video code stream encoded according to the high definition video code stream format and returned by the selected terminal and forward to the primary MCU; the secondary MCU is also used to receive the high definition multipicture video code stream image synthesized by the primary MCU and send to terminals attending the conference.

* * * * *